(12) United States Patent
Uesugi et al.

(10) Patent No.: US 12,020,410 B2
(45) Date of Patent: Jun. 25, 2024

(54) IMAGE PROCESSING APPARATUS THAT ALIGNS IMAGES, IMAGE PICKUP APPARATUS INCLUDING IMAGE PROCESSING APPARATUS, AND CONTROL METHOD FOR IMAGE PROCESSING APPARATUS

(71) Applicant: CANON KABUSHIKI KAISHA, Tokyo (JP)

(72) Inventors: Tomomi Uesugi, Kanagawa (JP); Koichi Washisu, Tokyo (JP); Mitsuhiro Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 17/467,337

(22) Filed: Sep. 6, 2021

(65) Prior Publication Data

US 2022/0076390 A1 Mar. 10, 2022

(30) Foreign Application Priority Data

Sep. 9, 2020 (JP) .................................. 2020-151561

(51) Int. Cl.
*G06T 5/80* (2024.01)
*G06T 5/50* (2006.01)
*G06T 7/33* (2017.01)

(52) U.S. Cl.
CPC .................. *G06T 5/80* (2024.01); *G06T 5/50* (2013.01); *G06T 7/337* (2017.01); *G06T 2207/20212* (2013.01)

(58) Field of Classification Search
None
See application file for complete search history.

(56) References Cited

U.S. PATENT DOCUMENTS 8,164,636 B1 * 4/2012 Linzer ................ H04N 23/6811
348/333.12
8,285,075 B2 * 10/2012 Makii .................... H04N 23/68
382/284

(Continued)

FOREIGN PATENT DOCUMENTS

JP 2008079123 A * 4/2008 ............... G02B 7/36
JP 4418632 B2 2/2010

OTHER PUBLICATIONS

Kalantari, Nima Khademi, and Ravi Ramamoorthi. "Deep hdr video from sequences with alternating exposures." Computer graphics forum. Vol. 38. No. 2. 2019. (Year: 2019).*

(Continued)

*Primary Examiner* — Incent Rudolph
*Assistant Examiner* — Meredith Taylor
(74) *Attorney, Agent, or Firm* — Cowan, Liebowitz & Latman, P.C.

(57) ABSTRACT

An image processing apparatus that can obtain a high-definition image by reducing an alignment mistake of a plurality of images. The image processing apparatus includes an alignment unit that performs sequential alignment that aligns adjacent images and reference alignment that aligns images other than a reference image to the reference image, and a control unit that controls the alignment unit to align a plurality of images that include a same object and are continuously picked up by an image pickup unit in time series by combining the sequential alignment and the reference alignment.

19 Claims, 12 Drawing Sheets

(56) References Cited

U.S. PATENT DOCUMENTS

| | | | |
|---|---|---|---|
| 10,482,679 B2* | 11/2019 | Bell | G06T 19/20 |
| 2008/0106608 A1* | 5/2008 | Clark | H04N 23/689 |
| | | | 348/208.99 |
| 2017/0353665 A1* | 12/2017 | Sato | H04N 23/51 |

OTHER PUBLICATIONS

Y. Watanabe, Takashi Komuro and Masatoshi Ishikawa, "Integration of time-sequential range images for reconstruction of a high-resolution 3D shape," 2008 19th International Conference on Pattern Recognition, Tampa, Fl, USA, 2008, pp. 1-4, doi: 10.1109/ICPR.2008.4761043. (Year: 2008).*

* cited by examiner

FIG. 2
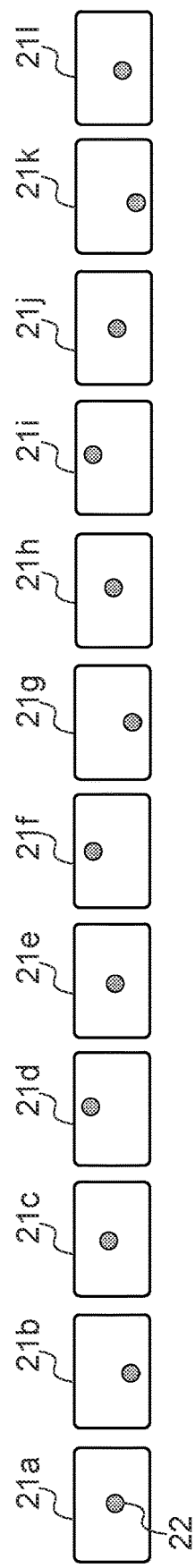
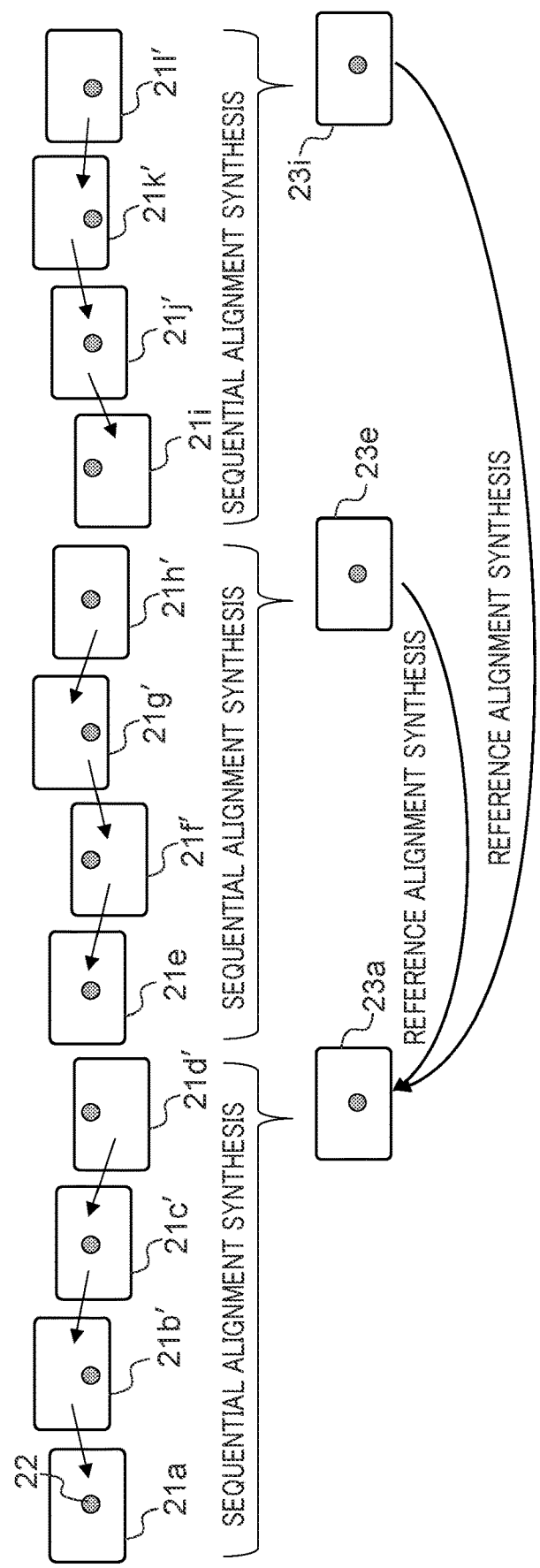

IMAGE PROCESSING APPARATUS THAT ALIGNS IMAGES, IMAGE PICKUP APPARATUS INCLUDING IMAGE PROCESSING APPARATUS, AND CONTROL METHOD FOR IMAGE PROCESSING APPARATUS

BACKGROUND OF THE INVENTION

Field of the Invention

The present invention relates to an image processing apparatus that aligns images, an image pickup apparatus including the image processing apparatus, and control method for the image processing apparatus.

Description of the Related Art

There is a known conventional technique called image combining stabilization that obtains an image (camera-shake corrected image) equivalent to a long time exposure image without camera shake by combining images that are continuously picked up in short time after aligning them. There is a method (hereinafter, referred to as sequential alignment combination) that aligns a current image and a previous image by eliminating a framing deviation between the images as a method of the image combining stabilization (for example, see Japanese Patent No. 4418632).

However, when the image combining stabilization is performed using the sequential alignment combination as shown in the above-mentioned publication, if once an alignment mistake occurs, subsequent images will be aligned to the image in which the alignment mistake occurs, which enlarges influence of image deterioration due to the alignment mistake. It should be noted that the image deterioration due to the alignment mistake does not only occur in the image combining stabilization but also occurs in HDR image combining that generates a high-dynamic-range image by combining a plurality of images. That is, the similar problem occurs in a technique that aligns a plurality of images, and the problem becomes remarkable as the number of images to be aligned increases.

SUMMARY OF THE INVENTION

The present invention provides an image processing apparatus, an image pickup apparatus including the image processing apparatus, and a control method for the image processing apparatus, which can obtain a high-definition image by reducing an alignment mistake of a plurality of images.

Accordingly, an aspect of the present invention provides an image processing apparatus including a memory device that stores a set of instructions, and at least one processor that executes the set of instructions to function as an alignment unit configured to perform sequential alignment that aligns adjacent images and reference alignment that aligns images other than a reference image to the reference image, and to function as a control unit configured to control the alignment unit to align a plurality of images that include a same object and are continuously picked up by an image pickup unit in time series by combining the sequential alignment and the reference alignment.

According to the present invention, the alignment mistake of a plurality of images can be reduced and a high-definition image can be obtained.

Further features of the present invention will become apparent from the following description of exemplary embodiments with reference to the attached drawings.

BRIEF DESCRIPTION OF THE DRAWINGS

FIG. 2 is a view showing an example in which image alignment combination according to a first embodiment is applied to twelve images that are continuously picked up with an image pickup unit shown in FIG. 1.

DESCRIPTION OF THE EMBODIMENTS

Figure 1:
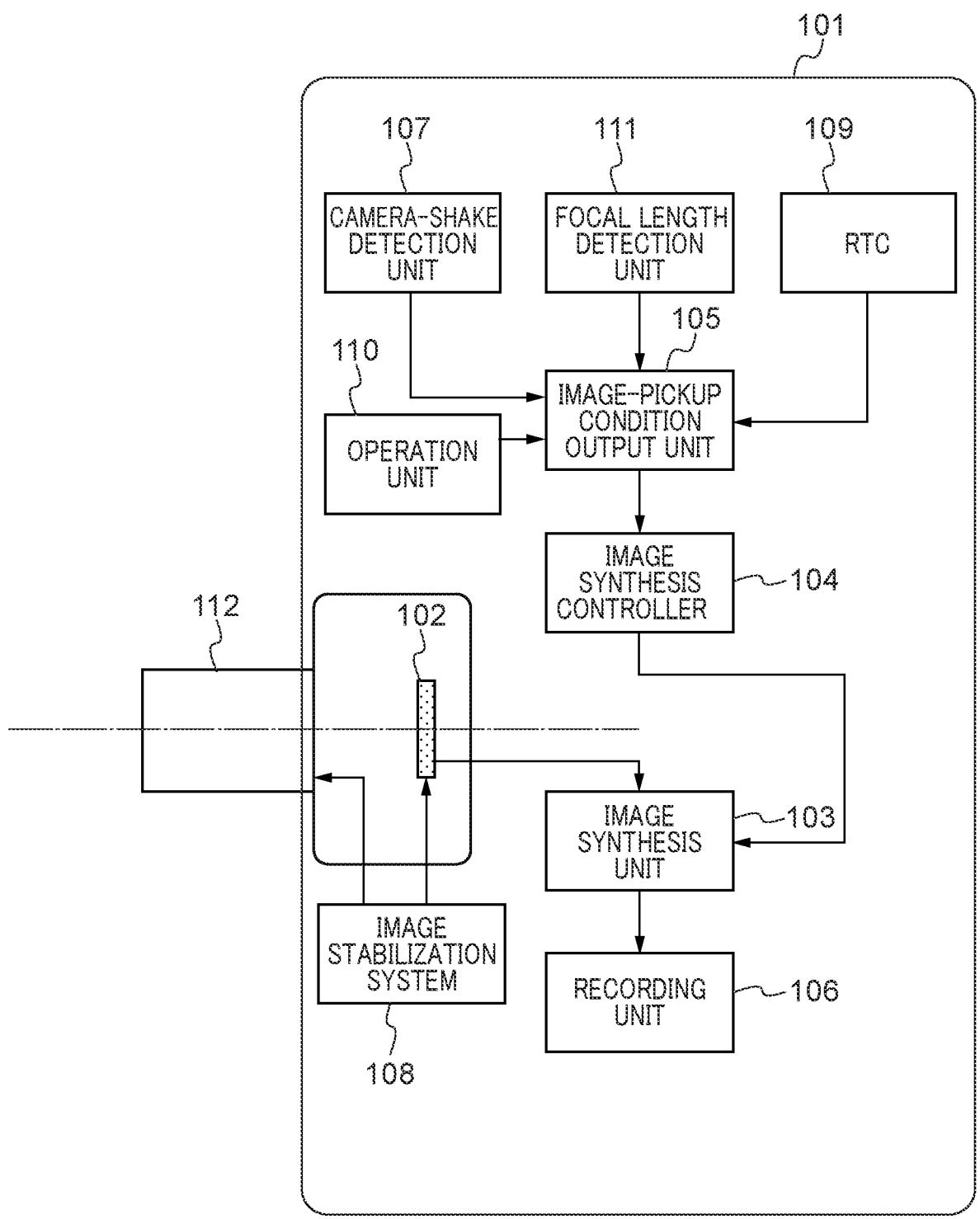
FIG. 1 is a block diagram showing a hardware configuration of a camera that includes an image processing apparatus of the present invention.

Hereafter, embodiments according to the present invention will be described in detail by referring to the drawings.

FIG. 1 is a block diagram showing a hardware configuration of a camera 101 as an image pickup apparatus that includes an image processing apparatus according to a first embodiment of the present invention.

As shown in FIG. 1, the camera 101 is provided with an image pickup unit 102, an image combining unit 103, an image combining controller 104, an image-pickup condition output unit 105, a recording unit 106, a camera-shake detection unit 107, an image stabilization system 108, an RTC 109, an operation unit 110, and a focal length detection unit 111. Moreover, an image pickup lens 112 is detachably attached to the camera 101. In this embodiment, the image combining unit 103 and the image combining controller 104 constitute the image processing apparatus according to the present invention. Moreover, the camera 101 of this embodiment has a controller (not shown) that achieves functions of the camera 101 by controlling respective components of the camera 101. The controller is a CPU, for example, that reads a program stored in a ROM (not shown) into a RAM (not shown) and executes the program so as to achieve the functions of the camera 101 by controlling the respective components of the camera 101. The ROM is a rewritable nonvolatile memory and stores programs that the controller can run, set values, GUI data, etc. The RAM is used to read a program that the controller runs and to save a value required during execution of a program. The image combining unit 103 and image combining controller 104 in FIG. 1 are functions that are achieved when the controller runs a program.

The operation unit 110 includes a release button, a touch sensor, an image stabilization switch for turning ON an image combining stabilization mode, etc. In the description, the image combining stabilization mode is a mode in which a camera-shake corrected image equivalent to a long time exposure image without camera shake is generated by combining images that are continuously picked up in short time after aligning them.

The image pickup unit 102 has an image sensor, such as a CCD or a CMOS. When the release button is pressed fully in a state where the image stabilization switch is ON, the image pickup unit 102 continuously generates images of a preset number (twelve in this embodiment) in time series and outputs the images of the preset number to the image combining unit 103 sequentially.

When receiving the images of the preset number from the image pickup unit 102, the image combining unit 103 generates a camera-shake corrected image by combining the obtained images after aligning them (image alignment combination). The image combining unit 103 may temporarily store the images obtained from the image pickup unit 102 into a memory (not shown), such as a detachable memory card or an internal memory, and combine the images read from the memory after aligning them. Hereinafter, images obtained from the image pickup unit 102 and images obtained by the image pickup unit 102 mean not only images output from the image pickup unit 102 but also images read from the memory as mentioned above.

The image combining unit 103 can execute two image alignment combination methods. A first method is sequential alignment combination that aligns a previous image and a following image (continuous two images) so as to cancel a framing deviation between the two images among a plurality of continuous images obtained by the image pickup unit 102 and combines the two images. A second method is reference alignment combination that selects a reference image from among the plurality of continuous images, aligns each of the remaining images to the reference image so as to cancel a framing deviation to the reference image, and combines them. A merit of the sequential alignment combination is that a framing deviation between two images to be aligned is small. The reason is that two images to be aligned are adjacent images and that a time interval between pickup timings of the adjacent images is extremely short. Accordingly, a range within which a framing deviation is searched can be narrowed and alignment combination is available at a high speed. In contrast, in the reference alignment combination, the larger a time interval between pickup timing of a reference image and a pickup timing of an aligned image is, the larger a framing deviation is. Accordingly, it is necessary to widen the range within which a framing deviation is searched, and the alignment combination needs more time. However, since the reference alignment combination aligns and combines all the remaining images to the reference image, only an image that causes an alignment mistake becomes a deterioration cause of a combined image. Accordingly, a degradation degree of a combined image in the reference alignment combination when an alignment mistake occurs in a group becomes smaller than that in the sequential alignment combining.

The image-pickup condition output unit 105 outputs an image pickup condition to the image combining controller 104, when the release button is pressed in half in the state where the image stabilization switch is ON. In this embodiment, the image-pickup condition output unit 105 outputs an image-pickup focal length as the image pickup condition detected by the focal length detection unit 111 to the image combining controller 104. Since the detection of the image-pickup focal length is a well-known technique, details are omitted.

When obtaining the image pickup condition (the image-pickup focal length in this embodiment) of the camera 101 from the image-pickup condition output unit 105, the image combining controller 104 controls the image combining unit 103 to execute at least one of the sequential alignment combination and reference alignment combination on the basis of the obtained image pickup condition.

The recording unit 106 records the camera-shake corrected image generated with the image combining unit 103 to the memory or temporarily records an aligned image mentioned below and a combined image.

The camera-shake detection unit 107 has inertia sensors, such as an angular velocity sensor and an acceleration sensor, and detects vibration like camera shake etc. occurred in the camera 101.

The image stabilization system 108 exhibits an optical image stabilization performance by coordinately controlling the image pickup unit 102 and image pickup lens 112.

The RTC (Real-Time Clock) 109 is an IC that has a time check function and checks time.

It should be noted that the image combining controller 104 and image combining unit 103 that constitute the image processing apparatus of the present invention may be provided in an external device that is different from the camera 101. In such a configuration, the images obtained with the image pickup unit 102 should be input to the external device through a recording medium like a memory card or communication with the camera 101.

FIG. 2 is a view showing an example in which image alignment combination according to this embodiment is applied to twelve images 21*a* through 21*l* that are continuously picked up with the image pickup unit 102.

As shown in FIG. 2, when the release button is pressed fully in the state where the image stabilization switch is ON, the image pickup unit 102 continuously picks up the images 21*a* through 21*l* that are targets of the image alignment combination in time series, and the images are output to the image combining unit 103. Positions of an object 22 in the images 21*a* through 21*l* are different in a vertical direction in FIG. 2. This shows that framings of the images are mutually different due to a camera shake, i.e., shows that the framing deviation occurs. Although the framing deviation in a horizontal direction in FIG. 2 may occur actually, the case where the framing deviation occurs only in the vertical direction in FIG. 2 is described in this embodiment in order to simplify the description. Moreover, in the description, the object 22 shall be stationary and the image pickup conditions (exposure time, an aperture value, focal length, etc.) of the images shall be fixed in order to simplify the description.

The image combining controller 104 instructs the image combining unit 103 to perform the sequential alignment combination of the images of the designated number (four in this embodiment) in the order of the images obtained from the image pickup unit 102.

In response to the instruction, the image combining unit 103 performs the sequential alignment combination of the images 21a through 21d obtained from the image pickup unit 102.

Specifically, the image combining unit 103 first detects a deviation (a framing deviation) between the position of the object 22 in the image 21a and the position of the object 22 in the image 21b and adjusts the position of the image 21b so as to cancel the framing deviation. The image 21b after the position adjustment is hereinafter called an image 21b'. In the same manner, the image combining unit 103 detects a deviation (a framing deviation) between the position of the object 22 in the image 21b' and the position of the object 22 in the image 21c and adjusts the position of the image 21c so as to cancel the framing deviation. The image 21c after the position adjustment is hereinafter called an image 21c'. Moreover, the image combining unit 103 detects a deviation (a framing deviation) between the position of the object 22 in the image 21c' and the position of the object 22 in the image 21d and adjusts the position of the image 21d so as to cancel the framing deviation. The image 21d after the position adjustment is hereinafter called an image 21d'.

A time interval between image pickup timings of two continuously picked-up images (hereinafter referred to as adjacent images) among the images 21a through 21l is short. Thereby, the framing deviation between adjacent images becomes small, which can shorten a period for detecting and calculating the framing deviation by the image combining unit 103. A well-known method may be used to detect the framing deviation between the adjacent images in the above-mentioned process. For example, a method of using a motion vector that is found by comparing positions of feature points of images, a method using detection results of inertia sensors (an angular velocity sensor, an acceleration sensor, etc.), or a method using both of the motion vector and the detection results of the inertia sensors may be employed.

Next, the image combining unit 103 generates a combined image 23a by combining the image 21a and the aligned images 21b', 21c' and 21d' after adjusting brightness and trimming of areas that do not overlap during combining.

In this way, the images (four images in this embodiment) of the number designated by the image combining controller 104 are sequentially aligned and combined as one group. The number of images belonging to one group is limited. This aims to decrease a deterioration degree of a quality of a combined image. That is, when an alignment mistake occurs once in a group subjected to the sequential alignment combination, the mistake influences all the following images of the group. Accordingly, the more the number of images in one group is, the larger the deterioration degree of a quality of a combined image is. In order to prevent this, the number of images is restricted.

When the number of the combined images that have been generated by the image combining unit 103 does not reach a prescribed number (three in this embodiment), the image combining controller 104 repeatedly instructs the image combining unit 103 to perform the sequential alignment combination of newly obtained four images.

Thereby, the image combining unit 103 sequentially aligns and combines the images 21e through 21h and generates a combined image 23e. Moreover, the image combining unit 103 sequentially aligns and combines the images 21i through 21l and generates a combined image 23i.

When the number of the combined images that have been generated by the image combining unit 103 reaches the prescribed number, the image combining controller 104 instructs the image combining unit 103 to perform a reference alignment combination process that selects the first combined image as the reference image, aligns and combines the remaining combined images to the reference image.

In response to the instruction, the image combining unit 103 performs the reference alignment combination of the combined images 23a, 23e, and 23i.

Specifically, the image combining unit 103 first detects a deviation (a framing deviation) between the position of the object 22 in the combined image 23a and the position of the object 22 in each the combined images 23e and 23i1b and adjusts the positions of the combined images 23e and 23i so as to cancel the framing deviations. The combined images 23e and 23i after the position adjustment are hereinafter called combined images 23e' and 23i'.

After that, the image combining unit 103 generates a camera-shake corrected image by combining the combined image 23a and the aligned combined images 23e' and 23i' after adjusting brightness and trimming of areas that do not overlap during combining.

It should be noted that framing deviations between the adjacent images among the combined images 23a, 23e, and 23i are estimated to be more than the framing deviations between the adjacent images among the images 21a through 21l. This is because the time intervals between the image pickup timings of the first images 21a, 21e, and 21i of the sequential alignment combining groups are longer than that of the adjacent images among the images 21a through 21l. Accordingly, the combined images 23a, 23e, and 23i are not subjected to the sequential alignment combination but are subjected to the reference alignment combination, so that the alignment combination accuracy becomes high.

In FIG. 2, although four images are sequentially aligned and combined in each of the group of images 21a through 21d, the group of the images 21e through 21h, and the group of the images 21i through 21l, the designated number of images subjected to the sequential alignment combination is changed according to the image-pickup focal length that is the image pickup condition. Specifically, the designated number of images subjected to the sequential alignment combination is lessened as the image-pickup focal length becomes longer. This is because an amount of the framing deviation between adjacent images tends to become large and to cause alignment mistake when the image-pickup focal length of the camera 101 is long. In such a case, the alignment combination accuracy becomes higher as the designated number of images subjected to the sequential alignment combination is fewer. On the contrary, when the image-pickup focal length of the camera 101 is short, since the framing deviation is small and inconspicuous even if an alignment mistake occurs. In such a case, the speed of the alignment combination is improved by increasing the prescribed number of images subjected to the sequential alignment combination.

Figure 3:
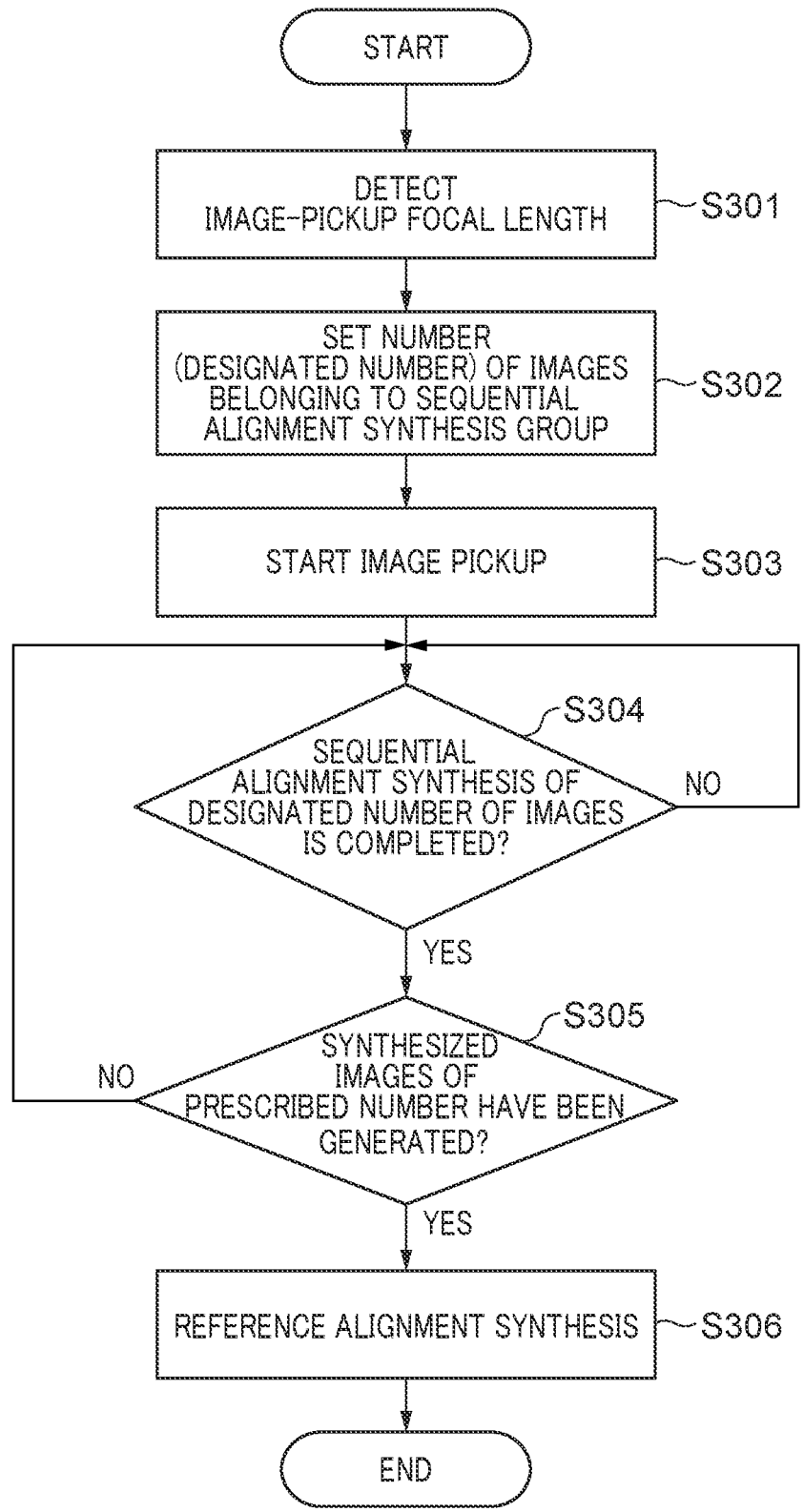
FIG. 3 is a flowchart showing an alignment combination process according to the first embodiment.

FIG. 3 is a flowchart showing an alignment combination process according to the first embodiment. This process is started when the image stabilization switch is turned ON.

First, when the release button is pressed in half, the image-pickup condition output unit 105 detects the image-pickup focal length by the focal length detection unit 111 and outputs it to the image combining controller 104 in a step S301.

In a step S302, the image combining controller 104 sets the number (designated number) of images belonging to one sequential alignment combining group to the image combining unit 103 on the basis of the image-pickup focal length output from the image-pickup condition output unit 105 in the step S301. Specifically, when the image-pickup focal length falls within a predetermined middle range, the designated number is set to four. When the image-pickup focal length is longer than the maximum value of the middle range, the designated number is set to three. And when the image-pickup focal length is shorter than the minimum value of the middle range, the designated number is set to six. Although the designated number is set to three, four, or six in this embodiment, the designated number may be set more finely on the basis of the image-pickup focal length. Namely, it is enough to satisfy a condition that the designated number set to the short image-pickup focal length is more than the designated number set to the long image-pickup focal length.

When the release button is fully pressed, the image pickup unit 102 starts the image pickup in a step S303. Thereby, the image pickup unit 102 picks up continuous images in time series and outputs the images to the image combining unit 103. It should be noted that the image pickup unit 102 picks up images of the set number (twelve in this embodiment) in the step S303 regardless of the designated number set in the step S302. Accordingly, for example, when the designated number is set to four in the step S302, the image combining controller 104 sets three as the number (prescribed number) of combined images that will be generated in order to generate a camera-shake corrected image.

In a step S304, the image combining controller 104 instructs the image combining unit 103 to perform the sequential alignment combination of the images of the designated number. The image combining unit 103 performs the sequential alignment combination of the images 21a through 21d in FIG. 2 in response to the instruction and generates the combined image 23a.

In a step S305, the image combining controller 104 repeatedly issues the instruction of the step S304 to the image combining unit 103 until the combined images of the prescribed number are generated. When the combined images of the prescribed number have been generated (YES in the step S305), the process proceeds to a step S306. Thereby, the combined images 23a, 23e, and 23i in FIG. 2 are generated.

In the step S306, the image combining controller 104 instructs the image combining unit 103 to perform the reference alignment combination and finishes this process. Thereby, the reference alignment combination of the combined images 23a, 23e, and 23i is performed, and a camera-shake corrected image is generated.

Since the number (designated number) of images that are subjected to the sequential alignment combination by the image combining unit 103 is changed on the basis of the image-pickup focal length of the camera 101 in this way, deterioration of the camera-shake corrected image due to an alignment mistake is reduced.

Although the number (designated number) of images that are subjected to the sequential alignment combination is set up only on the basis of the image-pickup focal length in this embodiment, the designated number may be set up by taking other image pickup conditions into consideration. For example, the following image pickup conditions (a) through (e) may be considered. This further reduces an alignment mistake in the image combining stabilization, which enables to obtain a high-definition camera-shake corrected image.

(a) Camera Shake Amount

When a camera-shake amount detected with the camera-shake detection unit 107 is large, the number of images subjected to the sequential alignment combination is reduced. In this case, the image-pickup condition output unit 105 outputs the camera-shake amount detected with the camera-shake detection unit 107 as the image pickup condition. The camera-shake amount detected before starting the image pickup process of the step S303 may be used.

(b) Optical Image Stabilization Performance

When the image stabilization system 108 exhibits an optical image stabilization performance by cooperation with the camera 101 and the image pickup lens 112, the optical image stabilization performance varies in accordance with a combination of the camera 101 and the image pickup lens 112. Accordingly, since a combination of which the image stabilization performance is low enlarges the framing deviation due to the camera shake, the number of combined images of the sequential alignment is reduced. In this case, the image-pickup condition output unit 105 outputs the optical image stabilization performance on the basis of the combination of the camera 101 and the image pickup lens 112 as the image pickup condition. For example, when the optical image stabilization is performed with the camera 101 or the image pickup lens 112, the number of combined images of the sequential alignment is reduced as compared with the case where the optical image stabilization is performed with both the camera 101 and the image pickup lens 112.

(c) Frequency Characteristic of Camera Shake

In general, an image stabilization accuracy of the image stabilization system 108 mounted in the camera 101 is low for low-frequency camera shake. Accordingly, when the camera-shake detection unit 107 detects the low-frequency camera shake, the number of combined images of the sequential alignment is reduced. In this case, the image-pickup condition output unit 105 outputs the camera shake detected with the camera-shake detection unit 107 as the image pickup condition. For example, when a frequency of a main component of camera shake detected with the camera-shake detection unit 107 is low, the number of combined images of sequential alignment is reduced as compared with the case where a frequency of a main component of camera shake detected with the camera-shake detection unit 107 is high.

(d) Elapsed Time from Start of Image Stabilization

Since the image stabilization accuracy of the image stabilization system 108 mounted in the camera 101 is low in an early stage of the image stabilization, the number of combined images of the sequential alignment is reduced in a first period (for example, one second) from a start of the image stabilization. In this case, the image-pickup condition output unit 105 outputs the elapsed time from the start of the image stabilization measured by the RTC 109 mounted in the camera 101 as the image pickup condition. For example, when the image pickup is started before the first period elapses from the start of the image stabilization, the number of combined images of the sequential alignment is reduced as compared with the case where the image pickup is started after the first period elapses from the start of the image stabilization. The image stabilization is started when the image stabilization switch is turned ON or when the release button is pressed in half.

(e) Elapsed Time from Start of Image Pickup

While a user picks up images by holding the camera 101, the camera shake increases with elapsed time from the start of the image pickup. This is because the user cannot check an object through a viewfinder eyepiece during the image pickup. Accordingly, during the image pickup, the number of combined images of the sequential alignment is reduced after a second period (for example, two seconds) elapses from the start of the image pickup. In this case, the image-pickup condition output unit 105 outputs the elapsed time from the start of the image pickup measured by the RTC 109 mounted in the camera 101 as the image pickup condition. For example, when the elapsed time from the start of the image pickup is longer than the second period, the number of combined images of the sequential alignment is reduced as compared with the case where the elapsed time from the start of the image pickup is shorter than the second period.

As mentioned above, the image combining controller 104 controls the image combining unit 103 to perform the sequential alignment combination and the reference alignment combination while combining according to the image pickup condition in this embodiment. This reduces an influence of an alignment mistake in the image combining stabilization, which enables to obtain a high-definition camera-shake corrected image.

Next, the second embodiment of the present invention will be described. A merit of the sequential alignment combination is that a framing deviation between two images to be aligned is small. The reason is that two images to be aligned are adjacent images and that a time interval between pickup timings of the adjacent images is extremely short. Accordingly, a range within which a framing deviation is searched can be narrowed and alignment combination is available at a high speed. In contrast, in the reference alignment combination, the larger a time interval between pickup timing of a reference image and a pickup timing of an aligned image is, the larger a framing deviation is. Accordingly, it is necessary to widen the range within which a framing deviation is searched, and the alignment combination needs more time. However, since the reference alignment combination aligns and combines all the remaining images to the reference image, only an image that causes an alignment mistake becomes a deterioration cause of a combined image. Accordingly, a degradation degree of a combined image in the reference alignment combination when an alignment mistake occurs in a group becomes smaller than that in the sequential alignment combination.

Accordingly, this embodiment employs a configuration that performs the reference alignment combination but does not perform the sequential alignment combination when the framing deviation between two images to be aligned is small.

It should be noted that configurations identical to that of the first embodiment among hardware configurations of this embodiment are referred by the same reference numerals and their descriptions are omitted.

In this embodiment, when the release button is pressed fully in the state where the image stabilization switch is ON, the image pickup unit 102 continuously outputs ten images in time series as targets of the image alignment combination.

Moreover, in this embodiment, the image-pickup condition output unit 105 outputs not only the image-pickup focal length detected by the focal length detection unit 111 but also the camera-shake amount of the camera 101 detected with the camera-shake detection unit 107 to the image combining controller 104 as the image pickup conditions.

Figure 4:
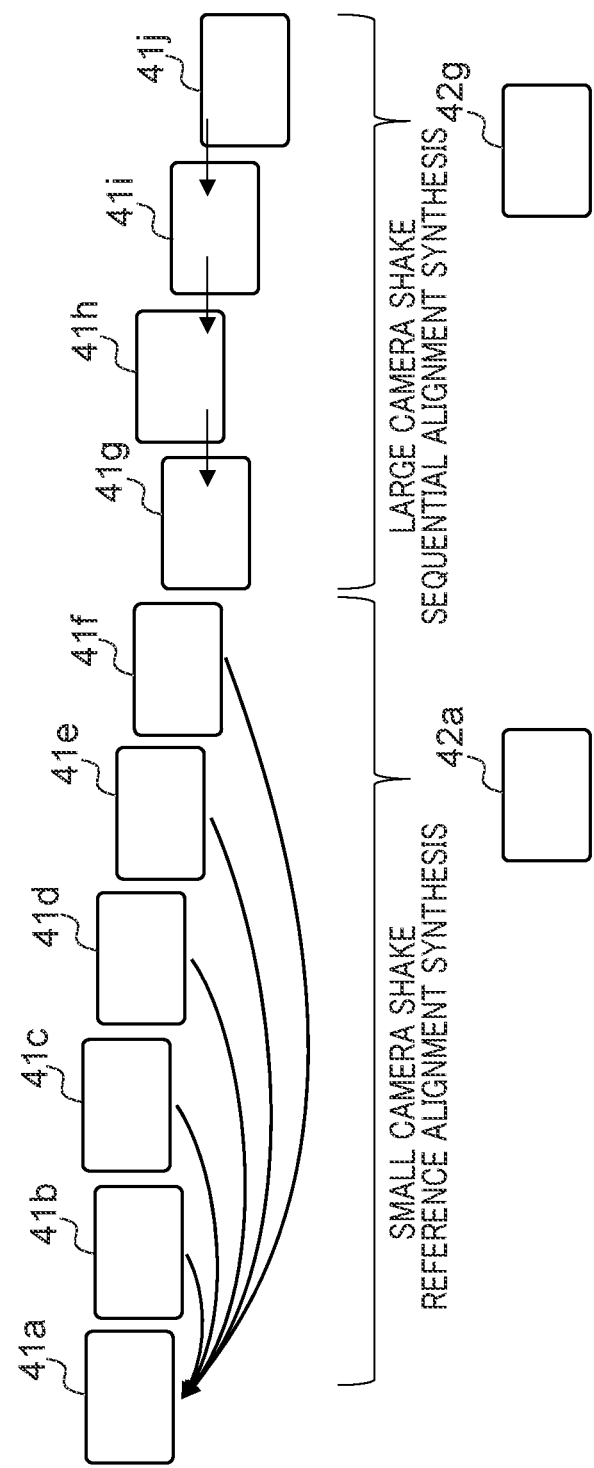
FIG. 4 is a view showing an example in which image alignment combination according to a second embodiment is applied to ten images that are continuously output in time series by image pickup with the image pickup unit.

FIG. 4 is a view showing an example in which image alignment combination according to the second embodiment is applied to ten images 41a through 41j that are continuously output in time series by image pickup with the image pickup unit 102.

FIG. 4 shows a case where the image-pickup condition output unit 105 outputs a small camera-shake amount in a first half of image pickup (a first period in which the images 41a through 41f are picked up) and outputs a large camera-shake amount in a second half of the image pickup (a second period in which the images 41g through 41j are picked up). In order to simplify the description, the image-pickup focal length output from the image-pickup condition output unit 105 shall be in the middle range that is not too large and too small.

In this case, the image combining controller 104 instructs the image combining unit 103 to perform the reference alignment combination of the images 41a through 41f picked up in the first period on the basis of the camera-shake amount output from the image-pickup condition output unit 105.

In response to the instruction, the image combining unit 103 aligns each of the images 41b through 41f to the image 41a as the reference image so as to cancel each framing deviation and combines the images 41a through 41f to generate a combined image 42a.

Moreover, the image combining controller 104 instructs the image combining unit 103 to perform the sequential alignment combining of the images 41g through 41j picked up in the second period on the basis of the camera-shake amount output from the image-pickup condition output unit 105.

In response to the instruction, the image combining unit 103 adjusts the position of the image 41h so as to cancel the framing deviation of the image 41h to the image 41g. The image 41h after the position adjustment is hereinafter called an image 41h'. Similarly, the position of the image 41i is adjusted so as to cancel the framing deviation of the image 41i to the image 41h'. The image 41i after the position adjustment is hereinafter called an image 41i'. Similarly, the position of the image 41j is adjusted so as to cancel the framing deviation of the image 41j to the image 41i'. The image 41j after the position adjustment is hereinafter called an image 41j'.

Next, the image combining unit 103 generates a combined image 42g by combining the image 41g and the aligned images 41h', 41i' and 41j' after adjusting brightness and trimming of areas that do not overlap during combining.

In this way, the image combining controller 104 instructs the image combining unit 103 to perform the reference alignment combination of the group of the images picked up in the first period in which the camera-shake amount is less than a threshold. In the meantime, the image combining controller 104 instructs the image combining unit 103 to perform the sequential alignment combination of the group of the images picked up in the second period in which the camera-shake amount is more than the threshold.

As a result, the image combining unit 103 generates the combined images 42a and 42g. After that, the image combining controller 104 instructs the image combining unit 103 to perform the reference alignment combination of the combined images 42a and 42g.

In response to the instruction, the image combining unit 103 performs the reference alignment combination of the combined images 42a and 42g to generate a camera-shake corrected image.

Such a configuration reduces degradation of a combined image due to an alignment mistake in each group and shortens a period required for the alignment combination.

Figure 5:
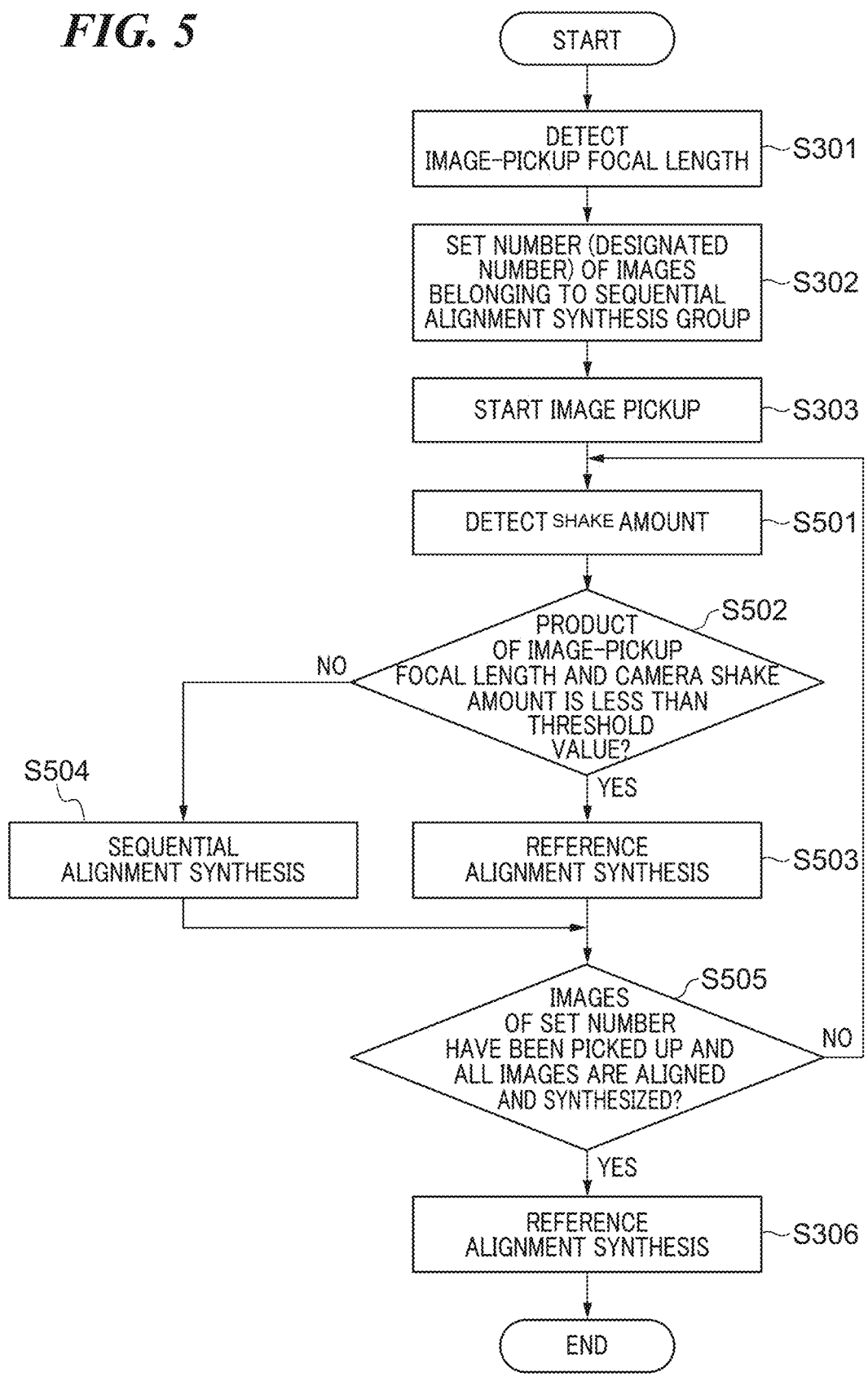
FIG. 5 is a flowchart showing an alignment combination process according to the second embodiment.

FIG. 5 is a flowchart showing the alignment combination process according to the second embodiment. This process is started when the image stabilization switch is turned ON.

It should be noted that the same step numbers are assigned to the steps in which the same processes in FIG. 3 are executed.

First, the processes of the steps S301 through S303 are executed.

In a step S501, the image-pickup condition output unit 105 detects a current camera-shake amount of the camera 101 using the camera-shake detection unit 107 and outputs the detection result to the image combining controller 104 as the image pickup condition.

In a step S502, the image combining controller 104 determines whether a product of the camera-shake amount output from the image-pickup condition output unit 105 in the step S501 and the image-pickup focal length is less than a threshold. When the product is less than the threshold, the process proceeds to a step S503. When the product is not less than the threshold, the process proceeds to a step S504. The reason for calculating the product of the image-pickup focal length and the camera-shake amount will be described. Even if the camera-shake amount is small, when the image-pickup focal length is long, the framing deviation on the image pickup surface of the image pickup unit 102 becomes large. On the contrary, even if the image-pickup focal length is short, when the camera-shake amount is large, the framing deviation on the image pickup surface of the image pickup unit 102 becomes large. Accordingly, the framing deviation amount on the image pickup surface is determined by finding the product of the image-pickup focal length and the camera-shake amount. It should be noted that the threshold may be changed depending on the image-pickup focal length as another method. For example, a first threshold is set corresponding to a first image-pickup focal length and a second threshold is set corresponding to a second image-pickup focal length. In this way, the similar effect to the method of calculating the product of the image-pickup focal length and the camera-shake amount is obtained by comparing the set threshold with the camera-shake amount.

In the step S503, the image combining controller 104 instructs the image combining unit 103 to perform the reference alignment combination and proceeds with the process to a step S505. Thereby, the image combining unit 103 is able to perform the combining process that suffers little influence of the alignment mistake. Moreover, since it is understood that the framing deviation between two images to be aligned is small, the image combining controller 104 instructs the image combining unit 103 to narrow the search range of the framing deviation. Thereby, the image combining unit 103 is able to shorten an alignment combining time.

In the step S504, the image combining controller 104 instructs the image combining unit 103 to perform the sequential alignment combination and proceeds with the process to the step S505. Thereby, the image combining unit 103 is able to perform the alignment combination at a high speed.

In the step S505, the image combining controller 104 determines whether the image pickup unit 102 has picked up images of a set number (ten in the example of FIG. 4) and whether all the images have been aligned and combined. If the conditions are not satisfied, the process returns to the step S501. The process from the step S501 is repeated until the conditions of the step S505 are satisfied. Thereby, the combined images 23a, 23e, and 23i in FIG. 2 are generated.

In the step S306, the image combining controller 104 instructs the image combining unit 103 to perform the reference alignment combination and finishes this process. Thereby, the reference alignment combination of the combined images 42a and 42g is performed, and a camera-shake corrected image is generated.

According to this process, during the image pickup, while the product of the image-pickup focal length and the camera-shake amount is small, the process proceeds to the step S503 from the step S502, and the reference alignment combination is performed. In the meantime, during the image pickup, while the product of the image-pickup focal length and the camera-shake amount is large, the process proceeds to the step S504 from the step S502, and the sequential alignment combination is performed. Thus, the number of images subjected to the sequential alignment combination is reduced by combining the reference alignment combination and the sequential alignment combination. As a result, deterioration of quality of a camera-shake corrected image due to an alignment mistake is reduced as compared with a case where a camera-shake corrected image is generated by performing the sequential alignment combination to all the images 41a through 41j.

When the camera shake amount becomes small after the reference alignment combination is changed to the sequential alignment combination because the camera-shake amount becomes large, the reference alignment combination may be used again.

Moreover, when the reference alignment combination is changed to the sequential alignment combination, the number of the remaining images may be taken into consideration. For example, in a case where the camera-shake amount of the images 41a through 41i in FIG. 4 is small and the camera-shake amount of the image 41j is large, even if the method is changed to the sequential alignment combination from the image 41j, it becomes the reference alignment combination of the images 41a and 41j substantially. Accordingly, when the number of the remaining images is less than a predetermined number (for example, less than two images), the combining method may not be changed.

Figure 6:
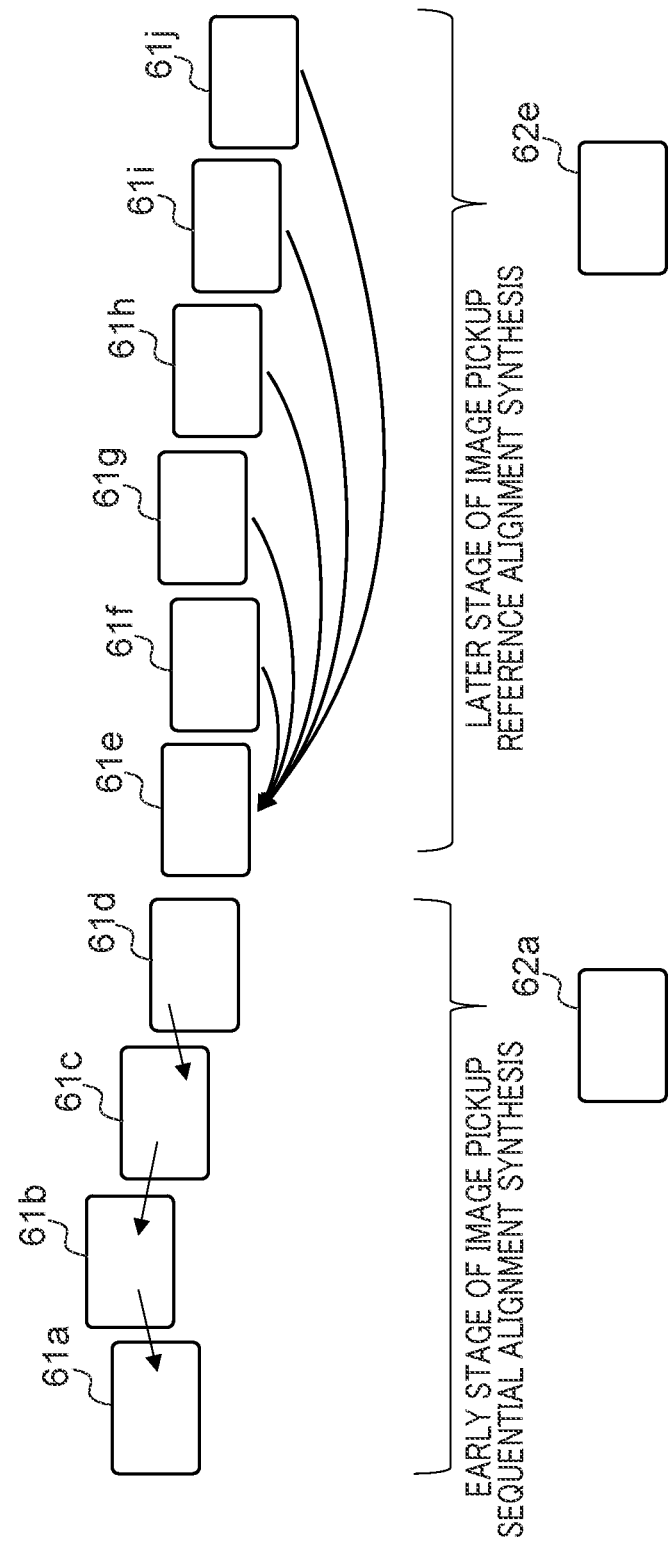
FIG. 6 is a view showing an example in which image alignment combination according to a variation example of the second embodiment is applied to ten images that are continuously output in time series by long-time image pickup with the image pickup unit.

FIG. 6 is a view showing an example in which image alignment combination according to a variation example of the second embodiment is applied to ten images 61a through 61j that are continuously output in time series by long-time image pickup with the image pickup unit 102.

As shown in FIG. 6, in a case of long-time image pickup, the sequential alignment combination is performed in an early stage of image pickup (a period in which the images 61a through 61d are picked up) and a combined image 62a is generated. In the meantime, the reference alignment combination is performed in a later stage (a period in which the images 61e through 61j are picked up) and a combined image 62e is generated.

The reason why the reference alignment combination is performed in the later stage of the image pickup in the long-time image pickup is that the camera-shake amount tends to become larger in the later stage of image pickup than the early stage of image pickup and that the alignment mistake occurs easily in the later stage. Accordingly, images 61e through 61j picked up in the later stage of image pickup are subjected to the reference alignment combination that uses the image 61e as the reference image and aligns the remaining images 61*f* through 61*j* to the image 61*e* while spreading the search range of the framing deviation, and a combined image 62*e* is generated.

After that, the image combining controller 104 instructs the image combining unit 103 to perform the reference alignment combination of the combined images 62*a* and 62*e* after completing generation of the combined images 62*a* and 62*e* with the image combining unit 103.

In response to the instruction, the image combining unit 103 performs the reference alignment combination of the combined images 62*a* and 62*e* to generate a camera-shake corrected image.

In the example like FIG. 6, although the alignment combination time becomes long, an accurate alignment combination is available. Accordingly, the alignment combination method executed when the camera-shake amount is large may be selected from among the reference alignment combination and the sequential alignment combination according to the image pickup mode etc. For example, the reference alignment combination may be performed when the camera-shake amount is large in a high image quality mode, and the sequential alignment combination may be performed when the camera-shake amount is large in the other modes.

Next, a third embodiment of the present invention will be described. The first and second embodiments postulate that a plurality of images used as the alignment targets are picked up on the almost same conditions and that the motion vector between images is obtained correctly in order to detect the framing deviation. However, when the plurality of images used as the alignment targets include an image of which the image pickup condition differs (for example, an illumination that is not used in the image pickup of the other images is used), the correct motion vector between images may not be obtained.

Consequently, the third embodiment is configured to enable stable alignment combination even if an image of which an image pickup condition differs. Hereinafter, the configuration of this embodiment is specifically described.

It should be noted that configurations identical to that of the first embodiment among hardware configurations of this embodiment are referred by the same reference numerals and their descriptions are omitted.

Figure 7:
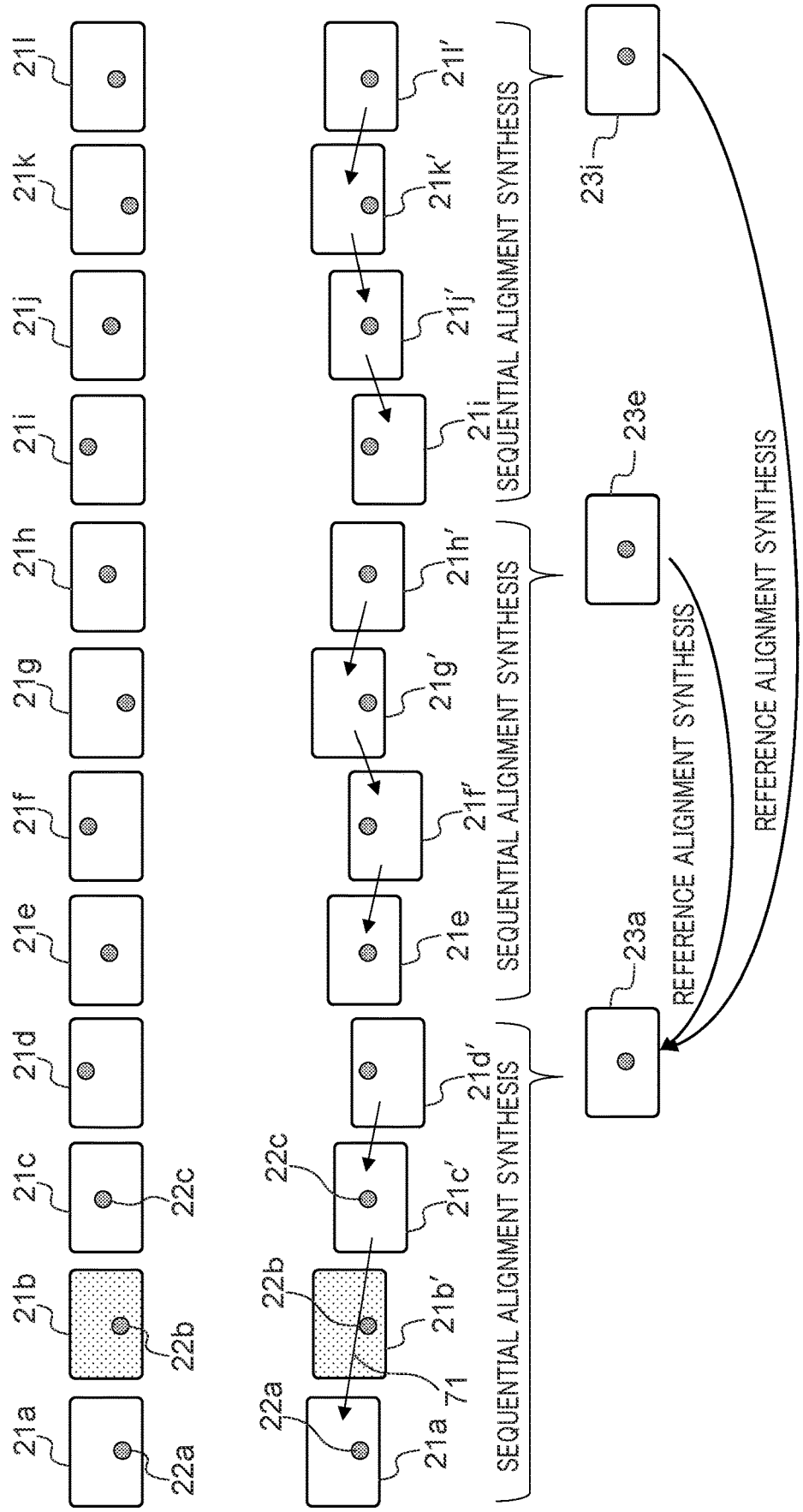
FIG. 7 is a view showing an example in which image alignment combination according to a third embodiment is applied to the twelve images shown in FIG. 2 that are generated by front curtain synchronization image pickup.

FIG. 7 is a view showing an example in which image alignment combination according to the third embodiment is applied, when the twelve images 21*a* through 21*l* shown in FIG. 2 are generated by front curtain synchronization image pickup. Namely, the image 21*b* shown in FIG. 2 is picked up with flash emission. The other images 21*a* and 21*c* through 21*l* are picked up without the flash emission.

In a known front curtain synchronization image pickup, a flash is emitted in an early stage of exposure. In this embodiment, the image 21*a* is picked up without the flash emission immediately before obtainment of the image 21*b* generated by flash image pickup. This enables to correct the framing deviation of the image 21*b* by obtaining a motion vector locus 71 as described below. Hereinafter, it is specifically described.

In this embodiment, when the image 21*b* is picked up with the flash emission in the early stages of the image pickup, the images 21*a* and 21*c* are picked up in a flash non-emission state (the same image pickup condition) immediately before and after the image pickup of the image 21*b*. It should be noted that the image 22*b* is picked up in an exposure time shorter than an exposure time of each of the other images 21*a* and 21*c* through 21*l* in the front curtain synchronization image pickup. Accordingly, the framing deviation amount of the image 21*b* becomes an intermediate amount of the framing deviation amounts of the images 21*a* and 21*c*. Accordingly, when the image 21*b* is aligned with the image 21*a* by the sequential alignment combination, the framing deviation of the image 21*c* is detected first, the position of the image 21*c* is adjusted so as to cancel the framing deviation, and an aligned image 21*c*' is generated. Next, the motion vector locus 71 between the image 21*a* and the image 21*c*' is calculated, and the image 21*b* is aligned using the calculated motion vector locus 71. That is, even if the framing deviation of the image 21*b* is not detected, the framing deviation of the image 21*b* is corrected, and an aligned image 21*b*' is obtained.

It should be noted that the image 21*a* that is picked up before the flash emission image 21*b* may be an image (what is called a live view image) picked up before fully pressing the release button and may not be used for combining. That is, the flash emission image pickup is performed after fully pressing the release button. When the flash emission image and the following flash non-emission images are combined, the image 21*b* may be aligned using the live view image 21*a* picked up before fully pressing the release button. In this way, a period between the full press of the release button and the flash emission is shortened and missing of image pickup opportunity is reducible by using the live view image for the alignment of the flash emission image.

Figure 8:
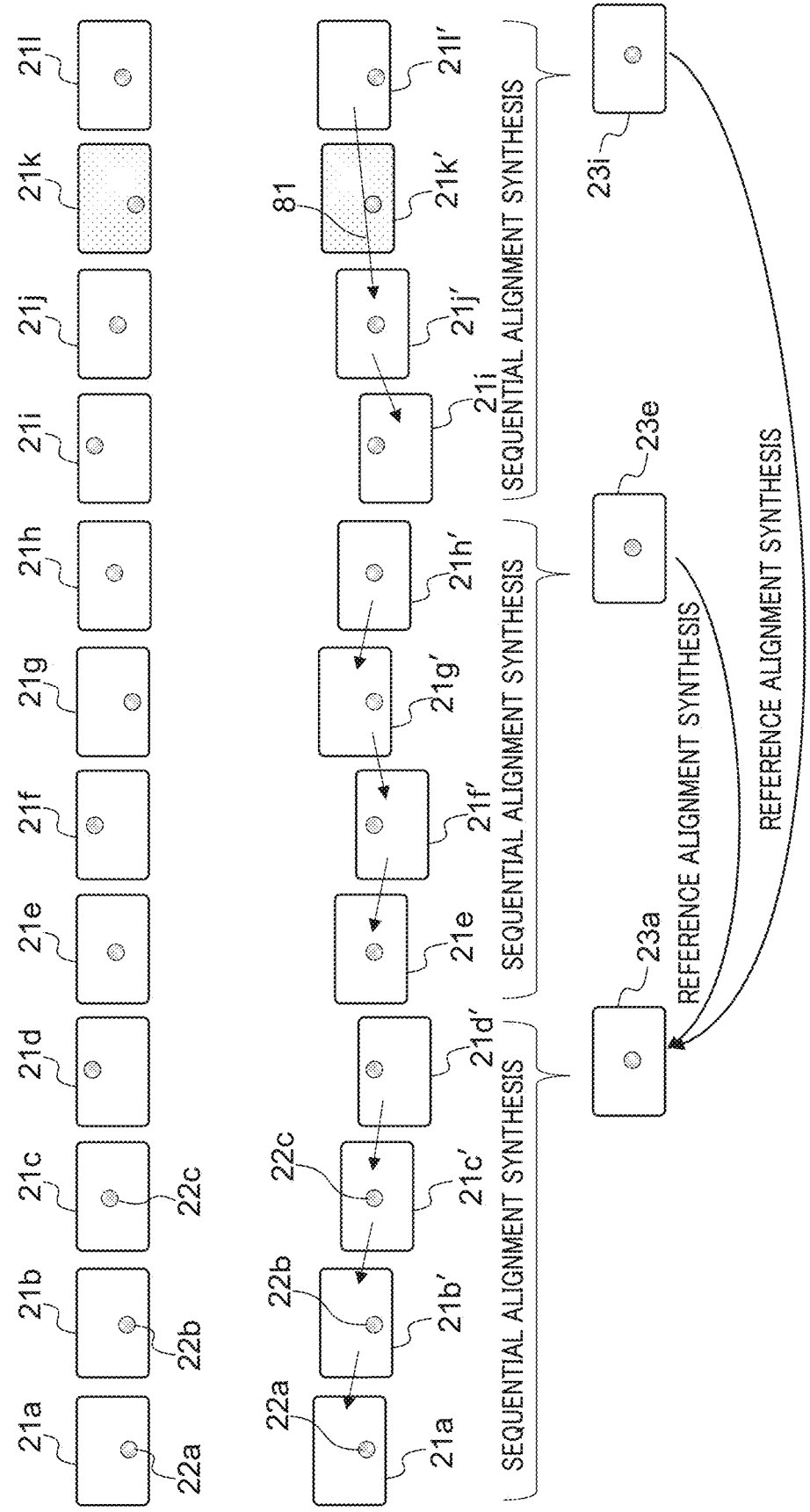
FIG. 8 is a view showing an example in which image alignment combination according to the third embodiment is applied to the twelve images shown in FIG. 2 that are generated by rear curtain synchronization image pickup.

FIG. 8 is a view showing an example in which image alignment combination according to the third embodiment is applied, when the twelve images 21*a* through 21*l* shown in FIG. 2 are generated by rear curtain synchronization image pickup. Namely, the image 21*k* shown in FIG. 2 is picked up with the flash emission. The other images 21*a* through 21*j* and 21*l* are picked up without the flash emission.

In a known rear curtain synchronization image pickup, the flash is emitted in a later stage of exposure. In this embodiment, the image 21*l* is picked up without the flash emission immediately after obtainment of the image 21*k* generated by flash image pickup. This enables to correct the framing deviation of the image 21*k* by obtaining a motion vector locus 81. Hereinafter, it is specifically described.

In this embodiment, when the image 21*k* is picked up with the flash emission in the later stages of the image pickup, the images 21*j* and 21*l* are picked up in a flash non-emission state (the same image pickup condition) immediately before and after the image pickup of the image 21*k*. It should be noted that the image 22*k* is picked up in an exposure time shorter than an exposure time of each of the other images 21*a* through 21*j* and 21*l* in the rear curtain synchronization image pickup. Accordingly, the framing deviation amount of the image 21*k* becomes an intermediate amount of the framing deviation amounts of the images 21*j* and 21*l*. Accordingly, when the image 21*k* is aligned with the image 21*j* by the sequential alignment combination, the framing deviation of the image 21*l* is detected first, the position of the image 21*l* is adjusted so as to cancel the framing deviation, and an aligned image 21*l*' is generated. Next, the motion vector locus 81 between the image 21*j* and the image 21*l*' is calculated, and the image 21*k* is aligned using the calculated motion vector locus 81. That is, even if the framing deviation of the image 21*k* is not detected, the framing deviation of the image 21*k* is corrected, and an aligned image 21*k*' is obtained.

It should be noted that the image 21*l* picked up after the flash emission image 21*k* may be merely used to correct the framing deviation of the image 21*k* generated by the flash image pickup and may not be used for the combining. This is because an object tends to move after the flash emission.

When the image 21*l* includes the moved object, the quality of the camera-shake corrected image may deteriorate.

In this way, when the images 21*a* through 21*l* in FIG. 2 include an image of which the image pickup condition differs from the image pickup condition of the other images, the image combining unit 103 corrects the framing deviation of the image having the different image pickup condition using the framing deviations detected in the images picked up immediately before and after that.

Figure 9:
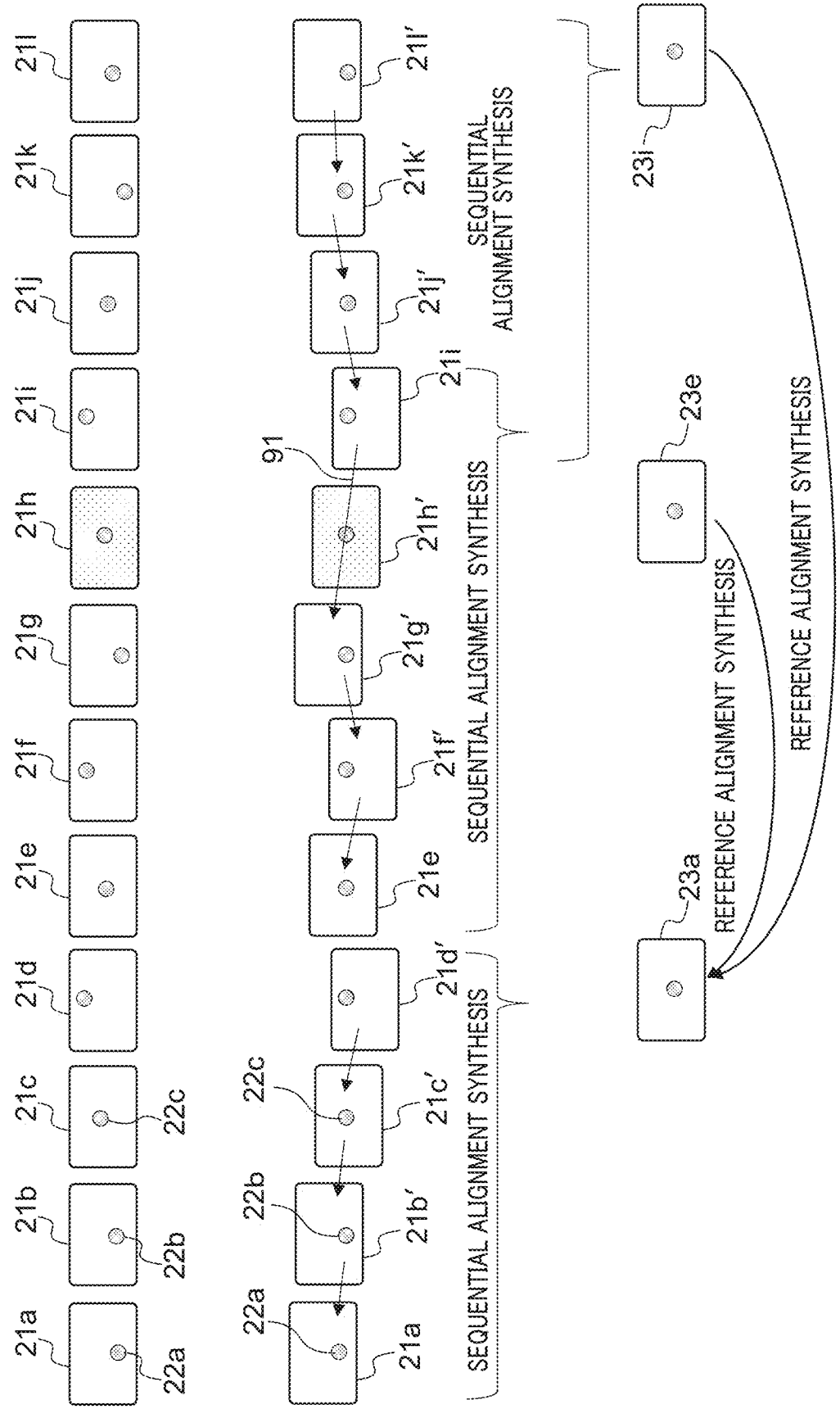
FIG. 9 is a view showing an example in which the image alignment combination according to the third embodiment is applied in a case where the last image of a second sequential alignment group shown in FIG. 2 is different in an image pickup condition.

FIG. 9 is a view showing an example in which the image alignment combination according to the third embodiment is applied in a case where the last image of a second sequential alignment group shown in FIG. 2 is different in the image pickup condition. In the description, a sequential alignment group means a group that includes images used to generate a combined image by the sequential alignment.

The image 21*h* picked up at a timing when fireworks shoot up and the image 21*g* picked up immediately before that are different in brightness. In such a case, the framing deviation between the images 21*g* and 21*h* cannot be obtained correctly. Accordingly, in this embodiment, the framing deviation of the image 21*h* is corrected first using the images 21*g* and 21*i* picked up immediately before and after the image 21*h* in the similar manner to FIG. 7 and FIG. 8. Specifically, the framing deviation of the image 21*i* to the image 21*g* is detected, the position of the image 21*i* is adjusted so as to cancel the framing deviation, and an aligned image 21*i*' is generated. Next, the motion vector locus 91 between the image 21*g* and the image 21*i*' is calculated, and the image 21*k* is aligned using the calculated motion vector locus 91. That is, even if the framing deviation of the image 21*h* is not detected, the framing deviation of the image 21*h* is corrected, and an aligned image 21*h*' is obtained.

As shown in FIG. 9, the images from the image 21*e* to the image 21*i* picked up immediately after the image 21*h* generated by firework image pickup are grouped into the sequential alignment group. However, the image 21*i* is used only to calculate the motion vector locus 91 for correcting the framing deviation of the image 21*h* and is not used for generation of the combined image 23*e*. That is, although the images 21*e* through 21*h* belong to the sequential alignment group in FIG. 2, FIG. 7, and FIG. 8, the images 21*e* through 21*i* belong to the sequential alignment group in FIG. 9. In the meantime, the combined image 23*e* is generated by using the images 21*e*, 21*f*, 21*g*', and 21*h*' in every case of FIG. 2, FIG. 7, FIG. 8, and FIG. 9. The reason is because alignment accuracies are equalized when the number of images subjected to the sequential alignment combination is matched for every group. Accordingly, when the firework pickup image is the image 21*g* and is not the last image 21*h* in the group, the images 21*e* through 21*h* are grouped into the sequential alignment group, and the combined image 23*e* is generated by using the image 21*e*, 21*f*, 21*g*', and 21*h*'.

FIG. 9 exemplifies the case where the image of which the image pickup condition differs is the image of which the brightness of the object differs from that of the other images in the sequential alignment group. However, the image pickup condition is not limited to the brightness. For example, presence or absence of the flash emission at an image pickup timing may be the image pickup condition.

Figure 10:
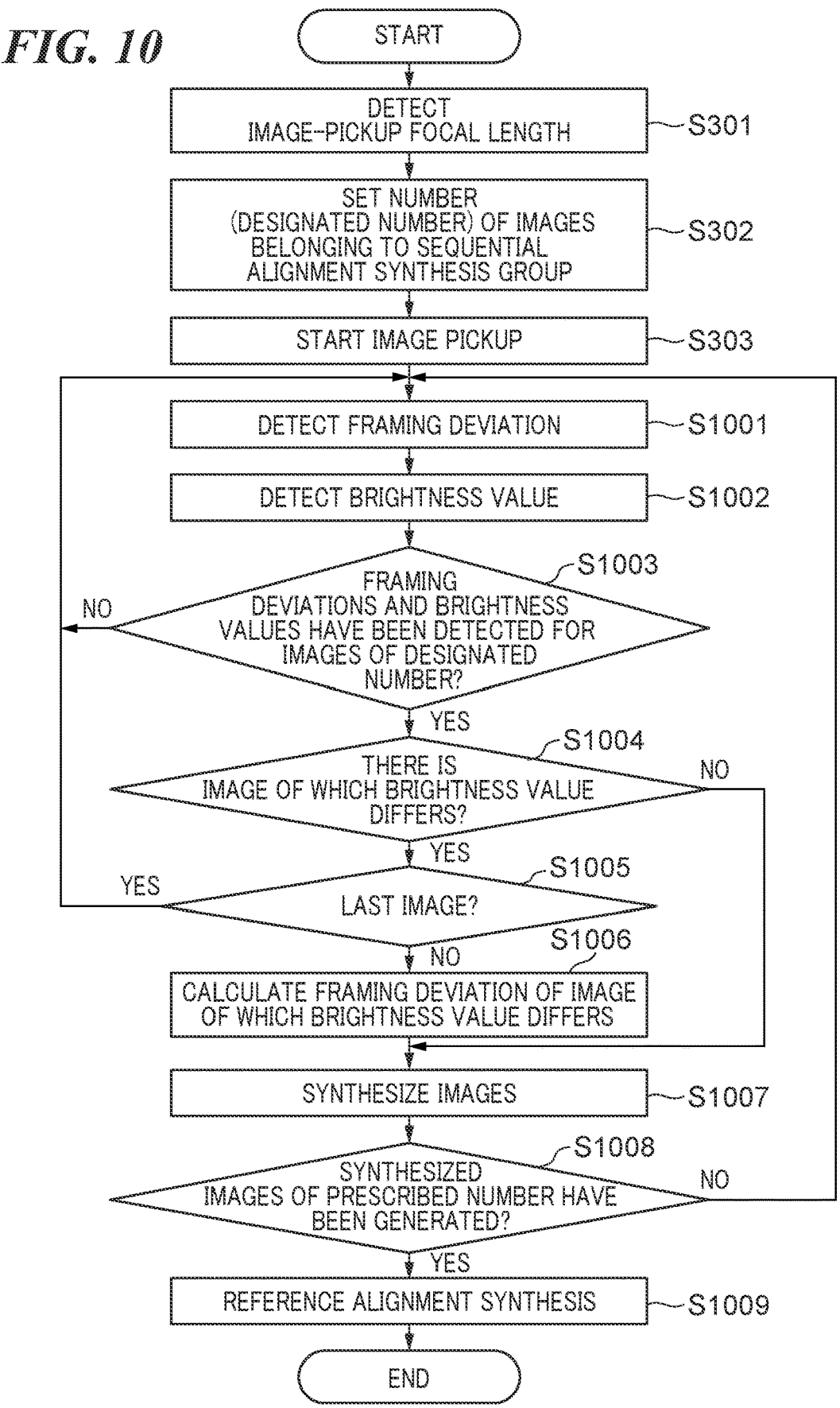
FIG. 10 is a flowchart showing an alignment combination process according to the third embodiment.

FIG. 10 is a flowchart showing the alignment combining process according to the third embodiment. This process is started when the image stabilization switch is turned ON. This process is applied to every pattern shown in FIG. 7, FIG. 8, and FIG. 9.

It should be noted that the same step numbers are assigned to the steps in which the same processes in FIG. 3 are executed.

First, the processes of the steps S301 through S303 are executed.

In a step S1001, the image combining controller 104 instructs the image combining unit 103 to detect the framing deviation of the image output from the image pickup unit 102. In response to the instruction, the image combining unit 103 detects the framing deviation between the output image and the image obtained immediately before that.

In a step S1002, the image combining controller 104 instructs the image combining unit 103 to detect a brightness value of the image output from the image pickup unit 102. In response to the instruction, the image combining unit 103 detects the brightness value of the output image.

In a step S1003, the image combining controller 104 determines whether the framing deviations and brightness values have been detected for the designated number (set in the step S302) of images. When determining that values have not yet been detected, the image combining controller 106 instructs the image combining unit 103 to repeat the processes of the steps S1001 and S1002. Thereby, the detection of the framing deviations and brightness values of the images belonging to the current sequential alignment group is completed.

In a step S1004, the image combining controller 104 determines whether there is an image of which a brightness value differs from that of the other image in the current sequential alignment group on the basis of the brightness values detected from the images belonging to the current sequential alignment group. When there is an image (a different brightness image) of which a brightness value differs, the process proceeds to a step S1005, and otherwise, the process proceeds to a step S1007.

In the step S1005, the image combining controller 104 determines whether the different brightness image determined in the step S1004 is the last image of the current sequential alignment group. When it is not the last image, the process proceeds to a step S1006. When it is the last image, the process returns to the step S1001 to detect a framing deviation and brightness value of a first image of the following sequential alignment group. Thereby, when the last image of the current sequential alignment group is the different brightness image, the vector locus for correcting the framing deviation of the last image is obtained by using the image picked up immediately after the last image. When there is no following sequential alignment group, the image combining controller 104 controls the image pickup unit 102 to pick up an additional image including the object 22 and proceeds with the process to the step S1006. This process is not included in the flowchart of FIG. 10.

In the step S1006, the image combining controller 104 calculates the framing deviation of the different brightness image. For example, when the brightness value of the image 21*h* in FIG. 9 differs, the framing deviation between the images 21*g* and 21*i* picked up immediately before and after the image 21*h* is detected, and the position of the image 21*i* is adjusted so as to cancel the framing deviation. Next, the motion vector locus 91 of the aligned image 21*i*' to the image 21*g* is calculated. Then, the framing deviation of the image 21*h* is calculated on the basis of the motion vector locus 91. It should be noted that the framing deviation of the image 21*h* becomes an intermediate amount of the framing deviation amounts of the adjacent images 21*g* and 21*i*.

In the step S1007, the image combining controller 104 instructs the image combining unit 103 to combine the images belonging to the current sequential alignment group after aligning the images on the basis of the framing deviations detected and calculated in the steps S1001 and S1006. According to this process, for example, the images 21b', 21c', and 21d' are generated on the basis of the images 21a through 21d in FIG. 9, and the combined image 23a is obtained by combining the images 21a, 21b', 21c', and 21d'. Moreover, the images 21f through 21i' are generated on the basis of the images 21e through 21i in FIG. 9, and the combined image 23e is obtained by combining the images 21e and 21f through 21i'.

In a step S1008, the image combining controller 104 determines whether the combined images of the prescribed number have been generated. The image combining controller 104 repeatedly performs the processes from the step S1001 until the combined images of the prescribed number are generated. When the combined images of the prescribed number have been generated (YES in the step S1008), the process proceeds to a step S1009. Thereby, the combined images 23a, 23e, and 23i in FIG. 9 are generated.

In the step S1009, the image combining controller 104 instructs the image combining unit 103 to perform the reference alignment combination and finishes this process. In response to the instruction, the image combining unit 103 performs the reference alignment combination of the combined images 23a, 23e, and 23i to generate a camera-shake corrected image.

In this way, when a different brightness image is generated during the image pickup in the state where the image stabilization switch is ON, the image combining unit 103 detects the framing deviation of the different brightness image by using the framing deviation (locus) between the images picked up immediately before and after the pickup of the different brightness image. Then, when the different brightness image is the last image in the current sequential alignment group, the framing deviation of the different brightness image is detected by also using an image of the following sequential alignment group.

Thereby, even when a different brightness image is generated during the image pickup in the state where the image stabilization switch is ON, a high-precision alignment combination becomes available.

As mentioned above, the framing-deviation detection method used in the case where the different brightness image is in the sequential alignment group has been described. Next, a framing-deviation detection method used in a case where an image of which a brightness value differ is included in a group (hereinafter referred to as a reference alignment group) of images, such as the images 41a through 41f in FIG. 4 and the images 61e through 61j in FIG. 6, that are subjected to the reference alignment to generate a combined image will be described.

As mentioned above, in the second embodiment, the images picked up in the period (FIG. 4) in which the camera-shake amount of the camera 101 detected with the camera-shake detection unit 107 is small and the images picked up in the later stage (FIG. 6) of the long-time image pickup are included in the reference alignment groups.

Figure 11:
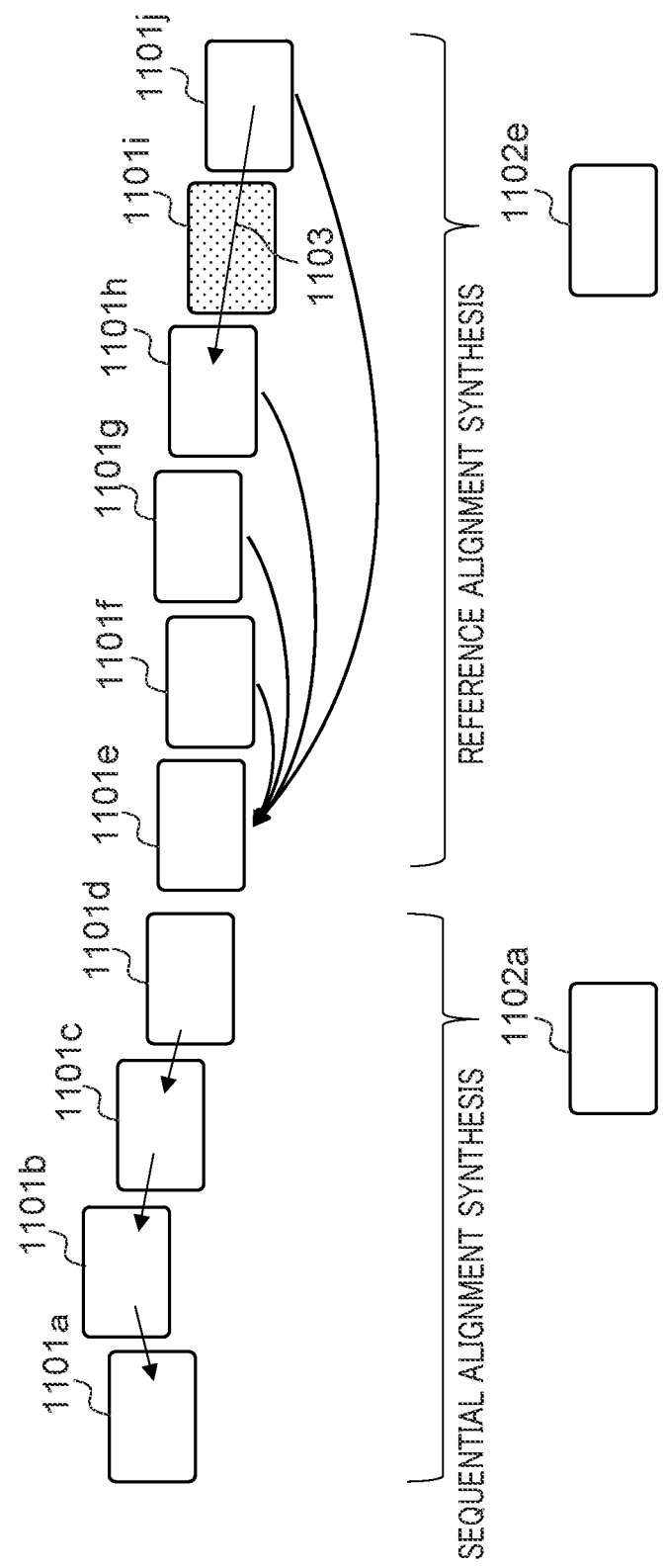
FIG. 11 is a view showing an example in which alignment combination according to a variation example of the third embodiment is applied in a case where the reference alignment group shown in FIG. 6 includes an image of which an image pickup condition differs.

FIG. 11 is a view showing an example in which alignment combining according to a variation example of the third embodiment is applied in a case where the reference alignment group shown in FIG. 6 includes an image of which an image pickup condition differs. Namely, ten images 1101a through 1101j are continuously output in time series by long-time image pickup with the image pickup unit 102. The six images 1101e through 1101j (corresponding to the images 61e through 61j in FIG. 6 that are picked up in the later stage of the long-time image pickup) among the ten images belong to a reference alignment group. And this group includes the image 1101i of which a brightness value differs.

The images 1101a through 1101d (corresponding to the images 61a through 61d in FIG. 6 that are picked up in the early stage of the long-time image pickup) are subjected to the sequential alignment combination and a combined image 1002a is generated.

The image combining unit 103 calculates a motion vector locus 1103 that shows difference between framing deviations of the images 1101h and 1101j, which are picked up immediately before and after the different brightness image 1101i, to the reference image 1101e. The framing deviation of the different brightness image 1101i is calculated on the basis of the motion vector locus 1103. The framing deviation of the image 1101i becomes an intermediate amount of the framing deviation amounts of the adjacent images 1101h and 1101j. After that, the combined image 1102e is obtained by combining the images after aligning the respective images on the basis of the framing deviations.

After that, the image combining controller 104 instructs the image combining unit 103 to perform the reference alignment combination of the combined images 1102a and 1102e after completing generation of the combined images 1102a and 1102e with the image combining unit 103.

In response to the instruction, the image combining unit 103 performs the reference alignment combination of the combined images 1102a and 1102e to generate a camera-shake corrected image.

Figure 12:
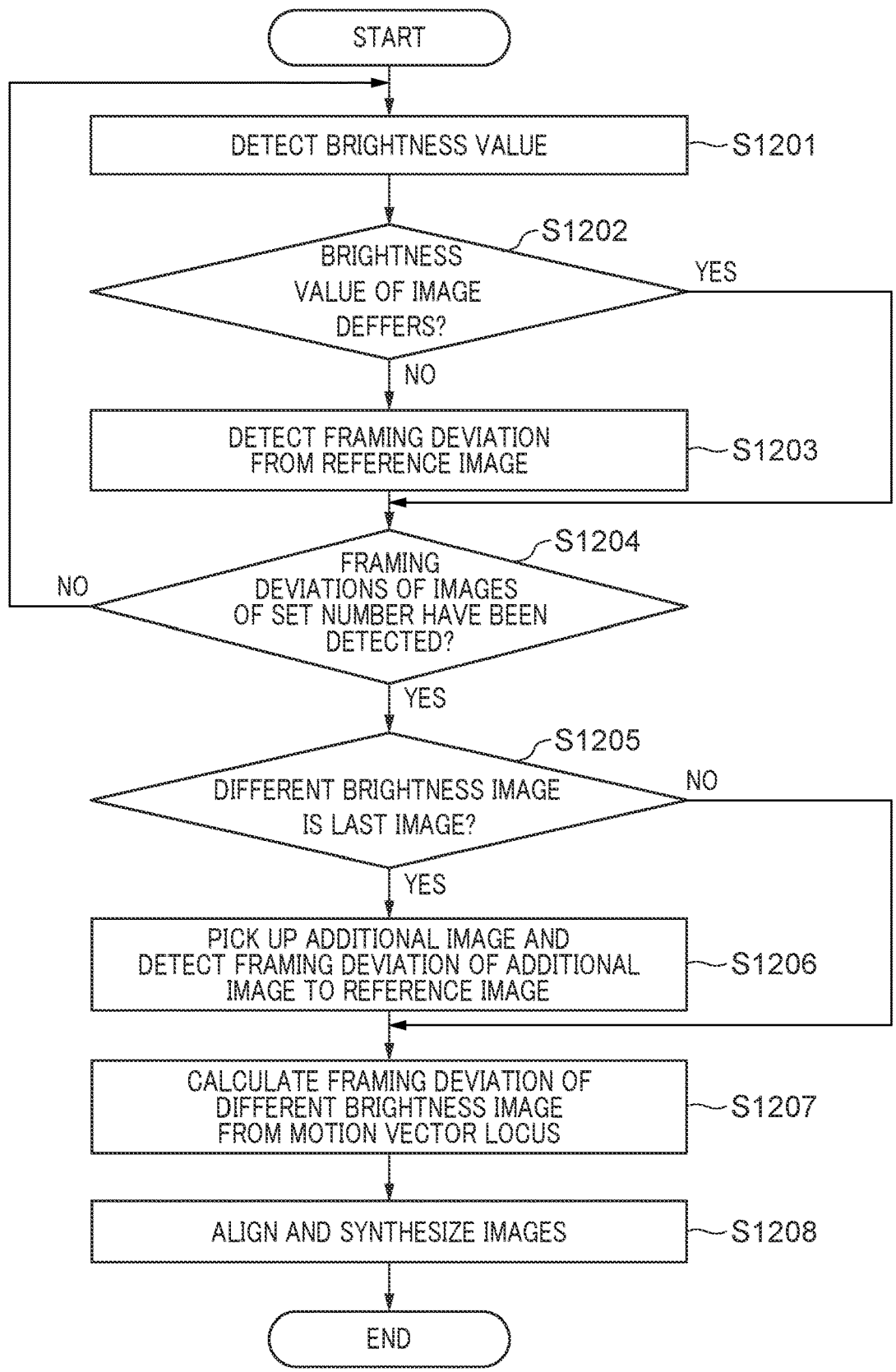
FIG. 12 is a flowchart showing an alignment combination process according to the variation example of the third embodiment.

FIG. 12 is a flowchart showing an alignment combination process according to the variation example of the third embodiment. The image pickup unit 102 starts continuous image pickup when the release button is fully pressed in the state where the image stabilization switch is ON. The process of FIG. 12 starts at a timing entering a later stage of the image pickup.

In a step S1201, the image combining controller 104 instructs the image combining unit 103 to detect a brightness value of the image output from the image pickup unit 102. In response to the instruction, the image combining unit 103 detects the brightness value of the output image.

In a step S1202, the image combining controller 104 determines whether the brightness value detected in the step S1201 of the image output from the image pickup unit 102 differs from a brightness value of an image that has been output from the image pickup unit 102 immediately before that. As a result of the determination, when the brightness value differs, the process proceeds to a step S1204 by skipping a step S1203, and otherwise (NO in the step S1202), the process proceeds to the step S1203.

In the step S1203, the image combining controller 104 instructs the image combining unit 103 to detect the framing deviation of the image output from the image pickup unit 102. In response to the instruction, the image combining unit 103 detects the framing deviation between the output image and its reference image.

In the step S1204, the image combining controller 104 determines whether framing deviations of images of a set number (six in the example of FIG. 11) that are picked up in the later stage of the image pickup have been detected. The image combining controller 103 repeats the processes from the step S1201 until detecting the framing deviations of the images of the set number. That is, the framing deviations of the respective images 1101f through 1101j that are sequentially output from the image pickup unit 102 with respect to the reference image 1101e are found. However, the framing deviation of the different brightness image 1101*i* to the reference image 1101*e* is not detected.

In a step S1205, the image combining controller 104 determines whether the different brightness image is the last image of the reference alignment group. When it is the last image, the process proceeds to a step S1206, and otherwise (NO in the step S1205), the process proceeds to a step S1207. In the step S1206, the image combining controller 104 controls the image pickup unit 102 to pick up an additional image including the object 22 and instructs the image combining unit 103 to detect a framing deviation of the additional image to the reference image. Then, the image combining unit 104 proceeds with the process to the step S1207. Thereby, even if the different brightness image is the last image of the reference alignment group, the framing deviation of the additional image picked up immediately after that to the reference image is obtained.

In the step S1207, the image combining controller 104 calculates the framing deviation of the different brightness image from the framing deviations of the images picked up immediately before and after that to the reference image. In the example of FIG. 11, the framing deviation of the image 1101*i* is calculated on the basis of the motion vector locus 1103 that shows the difference between the framing deviations of the images 1101*h* and 1101*j*.

In a step S1208, the image combining controller 104 performs the reference alignment combination of the images of the reference alignment group on the basis of the framing deviations calculated in the step S1203 and the framing deviation calculated in the step S1206. Then, the image combining controller 104 finishes this process.

In this way, when a different brightness image is generated during image picking of the reference alignment group, a framing deviation of the different brightness image is detected by using difference (a motion vector locus) between framing deviations of images picked up immediately before and after that to the reference image. Even when the different brightness image is generated during the image pickup of the reference alignment group, a high-precision alignment combination becomes available.

Although FIG. 12 shows the case where the different brightness image is generated in the later stage of the long-time image pickup in FIG. 6, the similar process is applicable to the case where the different brightness image is generated in the period in which the camera-shake amount of the camera 101 is small in FIG. 4.

As mentioned above, the stable image alignment combination becomes available by satisfying the following configuration in this embodiment.

1. When there is a different-condition image of which an image pickup condition, such flash emission and brightness variation of an object, differs, a framing deviation of the different-condition image is calculated by using difference (motion vector locus (alignment locus)) of framing deviations of images picked up immediately before and after the pickup of the different-condition image. And then, the different-condition image is aligned so as to cancel the framing deviation.

2. When the different-condition image is obtained, the images of which the image pickup condition matches are obtained immediately before and after the pickup of the different-condition image. Specifically, in a case of the front curtain synchronization image pickup, a flash non-emission image is obtained immediately before obtaining a flash emission image. In a case of the rear curtain synchronization image pickup, a flash non-emission image is obtained immediately after obtaining a flash emission image.

3. When the different-condition image is the last image of a group, a framing deviation of the last image is calculated by using a first image of the following group, and the last image is aligned so as to cancel the framing deviation. However, the first image of the following group is not used for the image combining of the group including the different-condition image. Moreover, when there is no following group, an additional image including the object 22 is picked up by the image pickup unit 102 and the framing deviation of the last image is calculated using the additional image.

4. When the different-condition image is included in a reference alignment group, difference between the framing deviations of the images that are picked up immediately before and after the different-condition image is calculated, and the framing deviation of the different-condition image is calculated by using the calculated difference.

Moreover, when the image that is not used for the image combining of the group including the different-condition image is not used to calculate the framing deviation of the different-condition image, it becomes easy to obtain an image that a user intends. Specifically, a flash non-emission image before a flash emission image in the front curtain synchronization image pickup and a flash non-emission image after a flash emission image in the rear curtain synchronization image pickup may not be used for the image combining.

Although the above-mentioned embodiments describe the case where a plurality of images are combined for the purpose of the image combining stabilization, the present invention is applicable to other techniques that align and combine a plurality of images, such as HDR image combining. Moreover, the alignment technique of the present invention is applicable also to a technique that does not combine a plurality of images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) T n, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-151561, filed Sep. 9, 2020, which is hereby incorporated by reference herein in its entirety.

What is claimed is:

1. An image processing apparatus comprising:
a memory device that stores a set of instructions; and
at least one processor that executes the set of instructions to:
  function as an alignment unit configured to set number of images as one group according to a tendency of framing deviation between adjacent images and perform sequential alignment that aligns the adjacent images in a first group in a plurality of images that include a same object and are continuously picked up by an image pickup unit in time series, and perform a reference alignment that aligns images other than a reference image to the reference image in a second group of the plurality of images that include the same object and are continuously picked up by the image pickup unit in time series;
  function as a control unit configured to control the alignment unit to align by the reference alignment a plurality of images that include a same object and are continuously picked up by an image pickup unit in time series by combining the sequential alignment resulting images in the first group and the reference alignment resulting images in the second group;
  function as an image combining unit configured to perform sequential alignment combination that combines images subjected to the sequential alignment with the alignment unit and to perform reference alignment combination that combines images subjected to the reference alignment with the alignment unit, and
wherein the control unit controls the image combining unit to generate a combined image by combining the results of the sequential alignment combination and the results of the reference alignment combination.

2. The image processing apparatus according to claim 1, wherein the at least one processor executes instructions in the memory device to function as an image-pickup condition output unit, and
wherein the control unit controls combination of the sequential alignment combination and the reference alignment combination in the image combining unit according to the first image pickup condition output from the image-pickup condition output unit.

3. The image processing apparatus according to claim 1, wherein when the plurality of images include a specific image of which a second image pickup condition differs, the alignment unit calculates an alignment locus of images picked up immediately before and after the specific image and aligns the specific image using the alignment locus.

4. The image processing apparatus according to claim 3, wherein the images picked up immediately before and after the specific image are matched in the second image pickup condition.

5. The image processing apparatus according to claim 4, wherein the second image pickup condition is presence of flash emission,
wherein the image pickup unit picks up a flash non-emission image that is matched in the second image pickup condition immediately before a flash emission image that is the specific image that differs in the second image pickup condition in a case where the plurality of images are generated by front curtain synchronization image pickup, and
wherein the image pickup unit picks up a flash non-emission image that is matched in the second image pickup condition immediately after the flash emission image that is the specific image that differs in the second image pickup condition in a case where the plurality of images are generated by rear curtain synchronization image pickup.

6. The image processing apparatus according to claim 5, wherein the image combining unit does not use the flash non-emission image that is picked up immediately after the flash emission image in the rear curtain synchronization image pickup.

7. The image processing apparatus according to claim 3, wherein the control unit
  controls the alignment unit to align images in the group by the reference alignment according to the first image pickup condition, and
  controls the image pickup unit to pick up an additional image that includes the same object after the pickup of the plurality of images and uses the additional image as the image picked up immediately after the specific image in a case where the specific image is included as the last image of a group and there is no following group.

8. The image processing apparatus according to claim 7, wherein the control unit uses a first image of a group following the group including the specific image as the image picked up immediately after the specific image in a case where the specific image is included as the last image of the group and there is the following group.

9. The image processing apparatus according to claim 7, wherein the control unit does not use the image picked up immediately after the specific image for the image combining of the group including the specific image as the last image.

10. The image processing apparatus according to claim 7, wherein in a case of long-time image pickup, the control unit controls the alignment unit to perform the sequential alignment combination in an early stage of the long-time image pickup, while performing the reference alignment combination in a later stage of the long-time image pickup so as to generate a plurality of combined images, and then to perform the reference alignment combination of the plurality of combined images.

11. The image processing apparatus according to claim 3, wherein the control unit calculates the alignment locus according to a framing deviation of the image picked up immediately after the specific image to the image picked up immediately before the specific image in a case where the specific image is included in a sequential alignment group.

12. The image processing apparatus according to claim 3, wherein the control unit calculates the alignment locus according to a difference between framing deviations of the images picked up immediately before and after the specific image to the reference image in a case where the specific image is included in a reference alignment group.

13. The image processing apparatus according to claim 1, wherein the tendency of framing deviation depends on an image-pickup focal length.

14. The image processing apparatus according to claim 13, wherein the number of images in the group when the image-pickup focal length is a first length is fewer than the number of images in the group when the image-pickup focal length is a second length which is shorter than the first length.

15. The image processing apparatus according to claim 1, wherein the first pickup condition is at least one of a camera-shake amount, an optical image stabilization performance, frequency characteristic of the camera shake, elapsed time from start of image stabilization, elapsed time from start of image pickup.

16. The image processing apparatus according to claim 1, wherein the first pickup condition is a camera-shake amount, and
the number of images in the group when the camera-shake amount is a first amount is fewer than the number of images in the group when the camera-shake amount is a second amount which is larger than the first amount.

17. The image processing apparatus according to claim 1, wherein the alignment unit sets at least three images as one group.

18. An image pickup apparatus comprising:
an image pickup unit having an image sensor and outputting a picked up image;
a memory device that stores a set of instructions; and
at least one processor that executes the set of instructions to:
function as an alignment unit configured to set number of images as one group according to a tendency of framing deviation between adjacent images and perform sequential alignment that the aligns adjacent images in a first group in a plurality of images that include a same object and are continuously picked up by an image pickup unit in time series, and perform a reference alignment that aligns images other than a reference image to the reference image in a second group of the plurality of images that include the same object and are continuously picked up by the image pickup unit in time series;
function as a control unit configured to control the alignment unit to align by the reference alignment a plurality of images that include a same object and are continuously picked up by the image pickup unit in time series by combining the sequential alignment resulting images in the first group and the reference alignment resulting images in the second group; and
function as an image combining unit configured to perform sequential alignment combination that combines images subjected to the sequential alignment with the alignment unit and to perform reference alignment combination that combines images subjected to the reference alignment with the alignment unit,
wherein the control unit controls the image combining unit to generate a combined image by combining the results of the sequential alignment combination and the results of the reference alignment combination.

19. An image processing method that aligns a plurality of images that include a same object and are continuously picked up in time series by an image pickup unit having an image sensor, the method comprising:
setting a number of images as one group according to a tendency of framing deviation between adjacent images and performing sequential alignment that aligns the adjacent images in a first group in a plurality of images that include a same object and are continuously picked up by an image pickup unit in time series, and performing reference alignment that aligns images other than a reference image to the reference image in a second group of the plurality of images that include the same object and are continuously picked up by the image pickup unit in time series;
controlling the alignment unit to align by the reference alignment a plurality of images that include a same object and are continuously picked up by an image pickup unit in time series by combining the sequential alignment resulting images in the first group and the reference alignment resulting images in the second group;
performing sequential alignment combination that combines images subjected to the sequential alignment with the alignment unit and performing reference alignment combination that combines images subjected to the reference alignment with the alignment unit; and
generating a combined image by combining the results of the sequential alignment combination and the results of the reference alignment combination.

* * * * *